US009130956B2

(12) United States Patent
Hao et al.

(10) Patent No.: US 9,130,956 B2
(45) Date of Patent: Sep. 8, 2015

(54) DE-REGISTRATION METHOD AND SYSTEM FOR IP MULTIMEDIA SUBSYSTEM CENTRALIZED SERVICE

(75) Inventors: Zhenwu Hao, Shenzhen (CN); Wei Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1001 days.

(21) Appl. No.: 13/141,087

(22) PCT Filed: Dec. 24, 2009

(86) PCT No.: PCT/CN2009/075940
§ 371 (c)(1),
(2), (4) Date: Jun. 21, 2011

(87) PCT Pub. No.: WO2010/075747
PCT Pub. Date: Jul. 8, 2010

(65) Prior Publication Data
US 2011/0258300 A1 Oct. 20, 2011

(30) Foreign Application Priority Data
Jan. 5, 2009 (CN) .......................... 2009 1 0000070

(51) Int. Cl.
*G06F 15/177* (2006.01)
*H04L 29/06* (2006.01)
(Continued)

(52) U.S. Cl.
CPC ........ *H04L 65/1016* (2013.01); *H04L 65/1073* (2013.01); *H04W 36/0005* (2013.01); *H04W 60/06* (2013.01); *H04L 61/1588* (2013.01); *H04W 8/06* (2013.01); *H04W 60/04* (2013.01)

(58) Field of Classification Search
CPC ..................... H04L 29/12188; H04L 61/1588; H04L 61/1511; H04L 65/1016; H04L 65/1073
See application file for complete search history.

(56) References Cited

U.S. PATENT DOCUMENTS 5,712,900 A * 1/1998 Maupin et al. ................ 455/433
6,591,101 B1 * 7/2003 Shimbori ................... 455/435.1
(Continued)

FOREIGN PATENT DOCUMENTS

CN 1241882 A 1/2000
CN 1777322 A 5/2006
(Continued)

OTHER PUBLICATIONS

International Search Report on international application No. PCT/CN2009/075940, mailed on Apr. 1, 2010.
(Continued)

*Primary Examiner* — Dhairya A Patel
(74) *Attorney, Agent, or Firm* — Oppedahl Patent Law Firm LLC

(57) ABSTRACT

A de-registration method and system for IP Multimedia Subsystem (IMS) centralized service are provided in the present invention, wherein the method comprises: a Circuit Switched User Equipment (CS UE) moves from a source enhanced Mobile Switch Center Server (eMSC Server) into the control area of a target Mobile Switch Center Server (MSC Server); during a location cancelling process in which the CS UE changes the MSC Server to which it is attached, the source eMSC Server starts up delay timing after receiving a location cancelling request; when the delay time is reached, the source eMSC Server performs the de-registration of the IP Multimedia Subsystem (IMS) instead of the CS UE. The method and system of the present invention ensure that the de-registration request of the source eMSC Server arrives at the Serving Call Session Control Function (S-CSCF) later than the registration request of the target MSC server, so as to avoid unnecessary redundant signaling and improve the system processing efficiency.

11 Claims, 8 Drawing Sheets

(51) Int. Cl.
  H04W 36/00 (2009.01)
  H04W 60/06 (2009.01)
  H04L 29/12 (2006.01)
  H04W 8/06 (2009.01)
  H04W 60/04 (2009.01)

(56) References Cited

U.S. PATENT DOCUMENTS

| | | | |
|---|---|---|---|
| 7,280,827 B2 * | 10/2007 | Shimbori | 455/433 |
| 2003/0190914 A1 | 10/2003 | Shimbori | |
| 2005/0086541 A1 * | 4/2005 | Rajaniemi | 713/202 |
| 2005/0255846 A1 | 11/2005 | Shimbori | |
| 2007/0117561 A1 | 5/2007 | Shu | |
| 2008/0137671 A1 * | 6/2008 | Agarwal et al. | 370/401 |
| 2008/0162637 A1 * | 7/2008 | Adamczyk et al. | 709/204 |
| 2010/0008352 A1 * | 1/2010 | Przybysz et al. | 370/352 |
| 2010/0037045 A1 * | 2/2010 | Schneyer et al. | 713/150 |
| 2011/0051701 A1 * | 3/2011 | Cai et al. | 370/338 |
| 2013/0012198 A1 | 1/2013 | Shu | |

FOREIGN PATENT DOCUMENTS

| | | | |
|---|---|---|---|
| EP | 0900494 B1 | | 4/2002 |
| EP | 1775970 | * | 4/2007 |
| EP | 1775970 A1 | | 4/2007 |
| JP | 2000316179 A | | 11/2000 |
| JP | 2003224875 A | | 8/2003 |
| JP | 2007202083 A | | 8/2007 |
| WO | 9744945 A2 | | 11/1997 |
| WO | 2006012803 A1 | | 2/2006 |
| WO | 2007045264 A1 | | 4/2007 |
| WO | WO 2007/045264 | * | 4/2007 |
| WO | 2008053511 A1 | | 5/2008 |

OTHER PUBLICATIONS

English Translation of the Written Opinion of the International Search Authority in international application No. PCT/CN2009/075940, mailed on Apr. 1, 2010.

Supplementary European Search Report in European application No. 09836034.0, mailed on Nov. 27, 2013, 8 total pages.

3GPP TS 23.292 v9.0.0, 3rd Generation Partnership Project; Technical Specification Group Services and System Aspects; IP Multimedia Subsystem (IMS) centralized services; Stage 2; Dec. 2008, see Supplementary European Search Report.

3GPP TSG-SA WG2 Meeting #71, Optimized signaling handling in IMS deregistration by MSC Server enhanced for ICS when UE changing MSC, Hungary, Feb. 16, 2009, see Supplementary European Search Report.

* cited by examiner

DE-REGISTRATION METHOD AND SYSTEM FOR IP MULTIMEDIA SUBSYSTEM CENTRALIZED SERVICE

TECHNICAL FIELD

The present invention relates to the technical field of mobile communications, in particular to a de-registration method and system for IP Multimedia Subsystem (IMS) centralized service applied in a location cancelling process.

BACKGROUND

At present, mobile networks, including a Global System for Mobile communications (GSM), a Universal Mobile Telecommunications System (UMTS), employ a circuit switching technology, called a Circuit Switched (CS) domain, to provide a user with a basic voice service and supplementary services based on a voice service. When a CS domain accesses an IMS, the CS domain evolves into an access mode and its services are uniformly provided by the IMS, and this mode is called IMS centralized service.

FIG. 1 is a schematic diagram illustrating an application scenario of IMS centralized service in an existing technology. As shown in FIG. 1, an IMS User Equipment (IMS UE) 101 accesses an IMS 105 via a packet switched domain access network 102 and obtains services provided by the IMS network. By adopting the IMS centralized service technology, a CS User Equipment (CS UE) 103 accesses the IMS 105 via a CS domain access network 104 and obtains services provided by the IMS network, then the IMS network can provide services for users employing different access modes.

FIG. 2 is an architecture diagram illustrating IMS centralized control service in an existing technology, which comprises the following network elements as shown in FIG. 2:

a CS UE 201, which accesses an enhanced Mobile Switch Center Server (eMSC Server) via CS control signaling;

an eMSC Server 202, which is an enhanced CS MSC Server, completes CS UE access, mobile management and call control, and additionally, serving as a Session Initiation Protocol (SIP) user agent, realizes a conversion between CS signaling and an SIP message and accesses an IMS instead of the user;

a Media Gateway (MGW) 203, for making a conversion between a media stream on a CS bearer and a media stream on an IP bearer and establishing a media connection between the CS UE 201 and a remote user;

a Call Session Control Function (CSCF) 204, which may be divided into an Interrogating CSCF (I-CSCF) and a Serving CSCF (S-CSCF), wherein the I-CSCF interacts with a Home Subscriber Server (HSS) to request the HSS to allocate an S-CSCF to the user or to interrogate which S-CSCF serves the user; wherein the S-CSCF is used for providing registration, call control and other functions for the user;

an Application Server (AS) 205, which comprises a service continuity application server and a telephone service application server, and so on, and provides the user with service including service continuity and telephone service;

an HSS/Home Location Register (HLR) 206, for storing subscription data of the user and providing supports for a call or session, wherein the HLR can be considered as a subset of the HSS and serves the conventional CS domain and packet switched domain, in a practical application, the HLR and HSS can be integrated and located in the same physical entity, and also can be located in different entities; when the HLR and HSS are located in different entities, an interface may be provided between them for realizing information exchange.

The CS UE 201 accesses the eMSC Server 202 via CS control signaling, the eMSC Server 202, serving as a user agent, instead of the user, accesses the CSCF 204 of the IMS network and establishes a session connection with the remote user, meanwhile, the eMSC Server 202 controls the MGW 203 to complete the conversion between the media stream on the CS bearer and the media stream on the IP bearer and establishes a media connection between the CS UE 201 and the remote user.

After the CS UE is successfully attached to the eMSC Server and successfully registers in the IMS via the eMSC Server which is a source MSC Server, when the CS UE moves, it may move into the control area of a new MSC Server, namely, a target MSC Server, wherein the target MSC Server may be a common MSC Server, namely an MSC server with no capacity of adding IMS centralized service, and also may be an eMSC server.

When the target MSC Server is an eMSC server, a current registration process is as shown in FIG. 3, for the sake of conciseness, the flow in FIG. 3 mainly illustrates a CS domain location update process and an IMS registration process, and no description will be given for other processes, such as security authentication and CS user data insertion; as shown in FIG. 3, the process mainly comprises the following steps.

Step 301, the UE initiates a CS attachment process and sends an attachment request to the target eMSC Server.

Step 302, the target eMSC Server sends a location update request to the HSS/HLR.

Step 303, the HSS/HLR accepts the location update and returns a location update accept response to the target eMSC server.

In a specific operation, standard CS access authentication and user data insertion are further performed in steps 302-303, and the HSS/HLR can insert an IMS centralized service indication into the user data or the location update accept response to illuminate that the user has subscribed the IMS centralized service.

Step 304, the target eMSC Server returns a CS attachment accept response to the UE.

As the target MSC Server is specifically a target eMSC Server here, therefore the target eMSC Server may check the IMS centralized service indication in the user data or location update accept response, or determines whether the user is an IMS centralized service user according to a locally configured filter rule, if the user is determined to be an IMS centralized service user, step 308 will be executed and the target eMSC Server will perform an IMS registration process instead of the UE.

Step 305, the HSS/HLR sends a location cancelling request to the source eMSC Server.

Step 306, the source eMSC Server returns a location cancelling response to the HSS/HLR and deletes a locally stored CS user record.

Step 307, the source eMSC Server performs an IMS de-registration process instead of the CS UE.

As the CS UE is not in an activated state any more in the source eMSC Server, therefore the source eMSC Server performs the IMS de-registration process instead of the CS UE and sends a de-registration request to the S-CSCF, and the S-CSCF deletes an old registration binding relationship, namely, deleting the relationship between a private user identity, a public user identity and the contact address of the source eMSC Server.

Step 308, the target eMSC server initiates the registration process of the IMS centralized service instead of the UE, after the user successfully completes the location update in the target eMSC Server, the target eMSC Server performs the IMS registration process instead of the UE, the target eMSC Server sends a registration request to the S-CSCF in the IMS, and the S-CSCF establishes a new registration binding relationship, namely establishing a relationship between a private user identity, a public user identity and the contact address of the target eMSC Server, thereby the IMS updates the registration binding relationship.

It is known from the above flow that the sequence of the registration request sent by the target eMSC server and the de-registration request sent by the source eMSC server arriving at the S-CSCF cannot be determined because the registration process initiated by the target eMSC Server and the de-registration process initiated by the source eMSC Server are performed independently, and practically, following two cases may be included as to the sequence of the registration request sent by the target eMSC server and the de-registration request sent by the source eMSC server arriving at the S-CSCF:

(1) if the de-registration request arrives at the S-CSCF earlier than the registration request, the S-CSCF first performs the de-registration process and deletes existing registration information, then reestablishes a new registration relationship when the registration request arrives at the S-CSCF; it can be learned that although there is no problem with the service logic, the de-registration process therein is not necessary, and the system efficiency is consequently influenced, moreover, after the de-registration process, the S-CSCF may release all the user data, as a result, the S-CSCF needs to redownload the user data in a new registration process, which causes redundant signaling and thereby affects the efficiency of the S-CSCF and the HSS; in addition, after the de-registration is completed, the HSS may allocate a new S-CSCF or the I-CSCF may reselect a new S-CSCF when a new registration is performed, which results in the S-CSCF being changed, furthermore, the S-CSCF may perform a third party registration/de-registration process and inform the AS of the registration information of the user, which affects the processing efficiency of the AS and may cause anomalies;

(2) if the registration request arrives at the S-CSCF earlier than the de-registration request, then the S-CSCF performs a registration process to replace the old registration relationship with a new one, subsequently, the de-registration request arrives at the S-CSCF, the S-CSCF finds out a new registration relationship by matching the user information in the de-registration request with the existing registration relationship, and further compares the contact addresses of the eMSC Servers, and rejects the de-registration request of the source eMSC Server which process is served as an exception handling process if the contact addresses are found to be different; and the source eMSC Server deletes local IMS registration data after receiving the refusal of the request; therefore, in this case, no service logic error is generated, wherein the user information in the de-registration request includes a private user identity and a public user identity.

From the above analysis it can be seen that the system processing efficiency may be affected due to the redundant signaling that may be generated if the de-registration request sent by the source eMSC Server arrives at the S-CSCF earlier than the registration request sent by the target eMSC Server.

SUMMARY

The present invention aims to provide a de-registration method and system for IMS centralized service, to address the problem existing in the prior art that there may be redundant signaling and low processing efficiency in a de-registration process when a CS UE moves from a source eMSC Server into the control area of a target MSC Server.

In order to solve the above technical problem, the present invention provides a de-registration method for IMS centralized service, the method comprises: a Circuit Switched User Equipment (CS UE) moves from a source enhanced Mobile Switch Center Server (eMSC Server) into the control area of a Mobile Switch Center Server (target MSC Server); during a location cancelling process in which the CS UE changes the MSC Server to which it is attached, the source eMSC Server starts up delay timing after receiving a location cancelling request sent by a Home Subscriber Server (HSS)/a Home Location Register (HLR);

when the delay time is reached, the source eMSC Server performs IP Multimedia Subsystem (IMS) de-registration instead of the CS UE.

Further, the method may have the following characteristic:
when a de-registration request sending timer is configured, the step of starting up delay timing further comprises that the source eMSC Server starts up delay timing by starting the de-registration request sending timer;
the de-registration further comprises: when the de-registration request sending timer overflows, the delay time is reached and the source eMSC Server performs the IMS de-registration instead of the CS UE.

Further, the method may have the following characteristic:
the delay time is further configured at the source eMSC Server locally;
specifically, the delay time is longer than the maximum time for a registration request of a target eMSC Server to arrive at a Serving Call Session Control Function (S-CSCF) via an Interrogating Call Session Control Function (I-CSCF) under normal conditions.

Further, the method may have the following characteristic:
the IMS de-registration specifically comprises: the source eMSC Server, instead of the CS UE, sends an IMS de-registration request to the IMS; and the source eMSC Server deletes local IMS registration data when receiving a de-registration success response or a de-registration failure response.

Further, the method may have the following characteristic:
under the condition that the delay time is not reached, if the contact address of a registration relationship established by the source eMSC Server, which is included in a registration notification message received by the source eMSC Server from the S-CSCF is not the contact address of the source eMSC Server itself, the source eMSC Server stops delay timing and deletes locally stored registration data of the CS UE.

Further, the method may have the following characteristic:
under the condition that the delay time is reached, the source eMSC Server sends a de-registration request to the S-CSCF via the I-CSCF.

Further, the method may have the following characteristic:
under the condition that the target MSC Server is an eMSC Server, the IMS de-registration further comprises: the target eMSC Server performs an IMS registration process instead of the CS UE, and an old registration binding relationship is replaced by a new one in the S-CSCF; and the S-CSCF rejects the IMS de-registration request after the IMS de-registration request sent by the source eMSC Server instead of the CS UE arrives at the S-CSCF.

Further, the method may have the following characteristic:
under the condition that the target MSC Server is a common MSC Server, the IMS de-registration further comprises: the S-CSCF de-registers an old registration binding relationship after the IMS de-registration request sent by the source eMSC Server instead of the CS UE arrives at the S-CSCF.

In order to address the above technical problem, the present invention also provides a de-registration system for IMS centralized service, the system comprises a delay timing unit and a de-registration unit; wherein the delay timing unit is used for that: when a CS UE moves from a source eMSC Server into the control area of a target MSC Server, the source eMSC Server starts up delay timing after receiving a location cancelling request sent by an HSS/HLR during a location cancelling process in which the CS UE changes the MSC server to which it is attached;

the de-registration unit is used for that: the source eMSC Server performs IMS de-registration instead of the CS UE when the delay time is reached.

Further, the system may have the following characteristic:
the delay timing unit is further used for that: when a de-registration request sending timer is configured, the source eMSC Server starts up delay timing by starting the de-registration request sending timer;

the de-registration unit is further used for that: when the de-registration request sending timer overflows, the delay time is reached and the source eMSC Server performs the IMS de-registration instead of the CS UE.

Further, the system may have the following characteristic:
the de-registration unit is further used for that: the source eMSC Server, instead of the CS UE, sends an IMS de-registration request to the IMS; and the source eMSC Server deletes local IMS registration data when receiving a de-registration success response or a de-registration failure response.

Further, the system may have the following characteristic:
the de-registration unit is further used for that: under the condition that the target MSC Server is an eMSC Server, the target eMSC Server performs an IMS registration process instead of the CS UE, and an old registration binding relationship is replaced by a new one in an S-CSCF; and the S-CSCF rejects the IMS de-registration request after the IMS de-registration request sent by the source eMSC Server instead of the CS UE arrives at the S-CSCF.

Further, the system may have the following characteristic:
the de-registration unit is further used for that: under the condition that the target MSC Server is a common MSC Server, the S-CSCF de-registers an old registration binding relationship after the IMS de-registration request sent by the source eMSC Server instead of the CS UE arrives at the S-CSCF.

With the method and the system of the present invention, the source eMSC Server delays the sending of a de-registration request when the CS UE moves between MSC servers, to guarantee that the de-registration request sent by the source eMSC Server arrives at the S-CSCF later than the registration request of the target MSC Server, thus avoiding unnecessary redundant signaling and improving the system processing efficiency.

DETAILED DESCRIPTION

Figure 1:
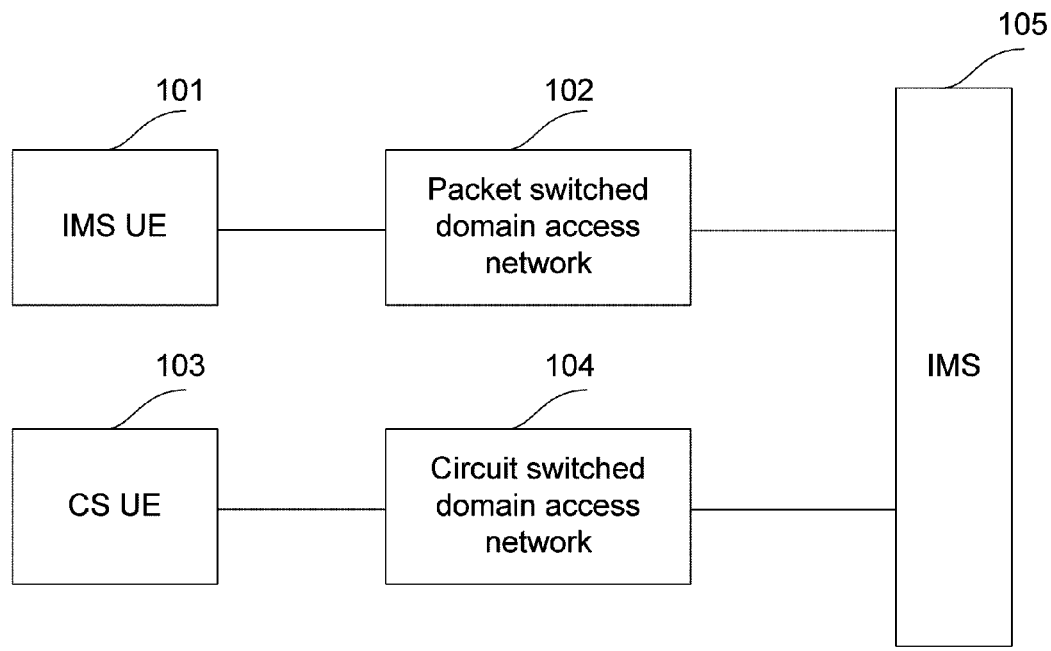
FIG. 1 is a schematic diagram illustrating an application scenario of IMS centralized service in an existing technology.
Figure 2:
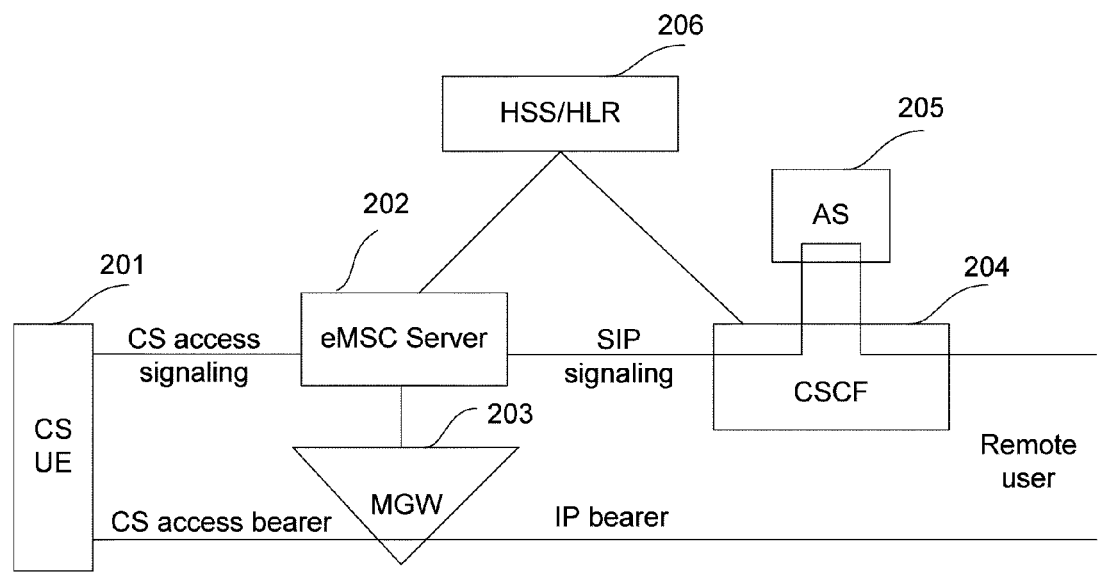
FIG. 2 is an architecture diagram illustrating IMS centralized control service in an existing technology.
Figure 3:
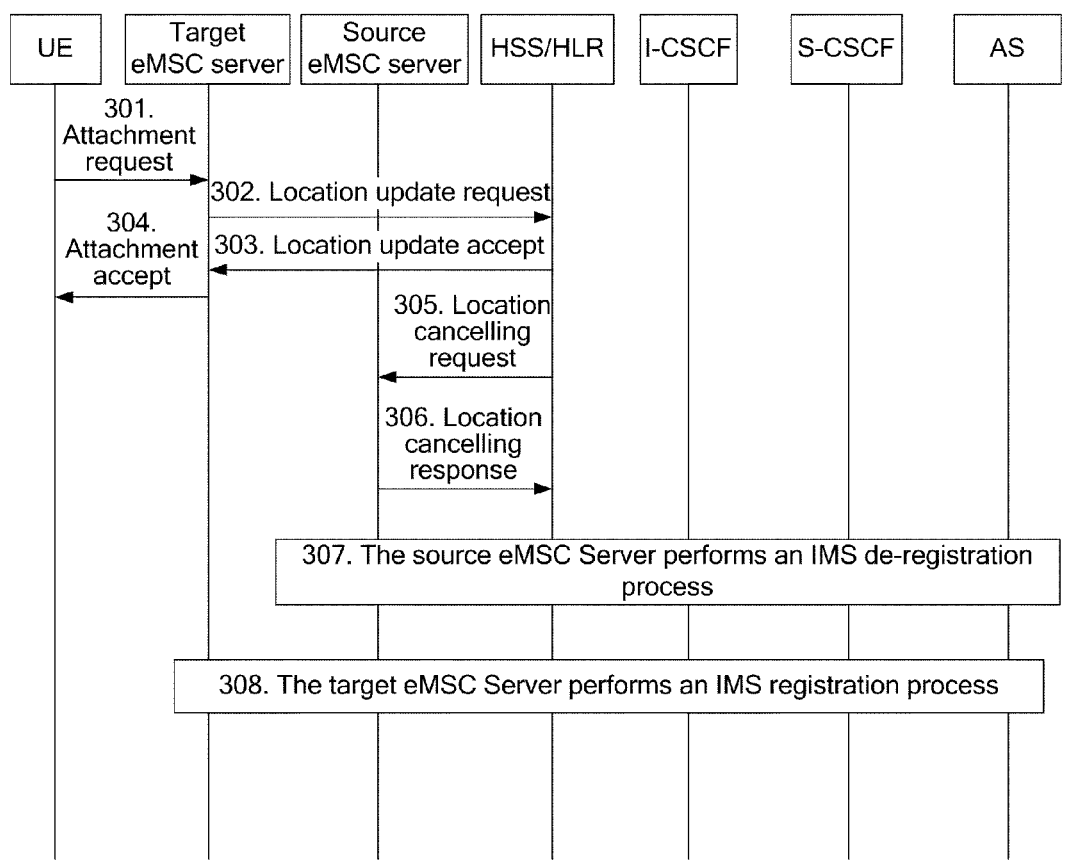
FIG. 3 is a registration flowchart of IMS centralized service when a UE moves between eMSC Servers in an existing technology.

As described above, in an IMS, after a CS UE is successfully attached to a source eMSC Server and successfully registers in the IMS via the source MSC Server, when the CS UE moves to a new MSC Server, namely a target MSC Server, if the target MSC Server is an eMSC Server, in view of the fact that the sending of a registration request from the target MSC Server to an S-CSCF and the sending of a de-registration request from the source eMSC Server to an S-CSCF are independent of one another, there may be problems of redundant signaling and low processing efficiency if the de-registration request arrives at the S-CSCF earlier than the registration request; in contrast, no problem is generated if the registration request arrives at the S-CSCF earlier than the de-registration request, therefore the above problem can be solved if it can be guaranteed that the registration request arrives at the S-CSCF earlier than the de-registration request.

In the present invention, the CS UE moves from the source eMSC Server into the control area of the target MSC Server, during a location cancelling process in which the UE changes the MSC Server to which it is attached, and the source eMSC Server starts up delay timing after receiving a location cancelling request sent by an HSS/HLR, when the delay time is reached, the source eMSC Server performs an IMS de-registration process instead of the UE, in this way, the source eMSC Server will delay the sending of the de-registration request after receiving the location cancelling request sent by the HSS/HLR to guarantee that the registration request arrives at the S-CSCF earlier than the de-registration request.

In embodiments of the present invention, a de-registration request sending timer is configured at eMSC Server and started to start up delay timing, when the de-registration request sending timer overflows, the delay time is reached and the source eMSC Server performs the IMS de-registration process instead of the UE.

The delay time, which is set at the source eMSC Server locally, is long enough and longer than the maximum time for the registration request of a target eMSC Server to arrive at the S-CSCF under normal conditions, wherein the delay time is an overflow value of the de-registration request sending timer.

The IMS de-registration process comprises: the source eMSC Server instead of the UE sends an IMS de-registration request to the IMS, and the source eMSC Server deletes local IMS registration data when receiving a de-registration success response or a de-registration failure response.

If the target MSC Server is an eMSC Server, it performs an IMS registration process instead of the UE, and an old registration binding relationship is replaced by a new one in the S-CSCF; and as the old binding relationship has not existed, the S-CSCF rejects the de-registration request after the de-registration request sent by the source MSC Server instead of the UE arrives at the S-CSCF.

If the target MSC Server is a common MSC Server, it does not perform an IMS registration process instead of the UE, and the S-CSCF de-registers an old registration binding relationship after the de-registration request sent by the source MSC Server instead of the user arrives at the S-CSCF.

Preferably, when the delay time is not reached, namely, the timer has not overflowed, if the source MSC Server, after receiving a registration notification message sent by the S-CSCF, finds that the contact address of the registration relationship established by the source MSC Server which is included in the registration notification message is not its own contact address, it stops delay timing and deletes locally stored registration data.

Preferred embodiments of the present invention are illustrated in detail in combination with the accompanying drawings, and it should be understood that the preferred embodiments described herein are only used to illuminate and explain the present invention but not to limit the present invention.

In order to facilitate the understanding, before specific implementation of the embodiments of the present invention is illuminated, a registration flow of IMS centralized service and a de-registration flow of IMS centralized service resulting from a location cancelling process are first described in brief.

Figure 4:
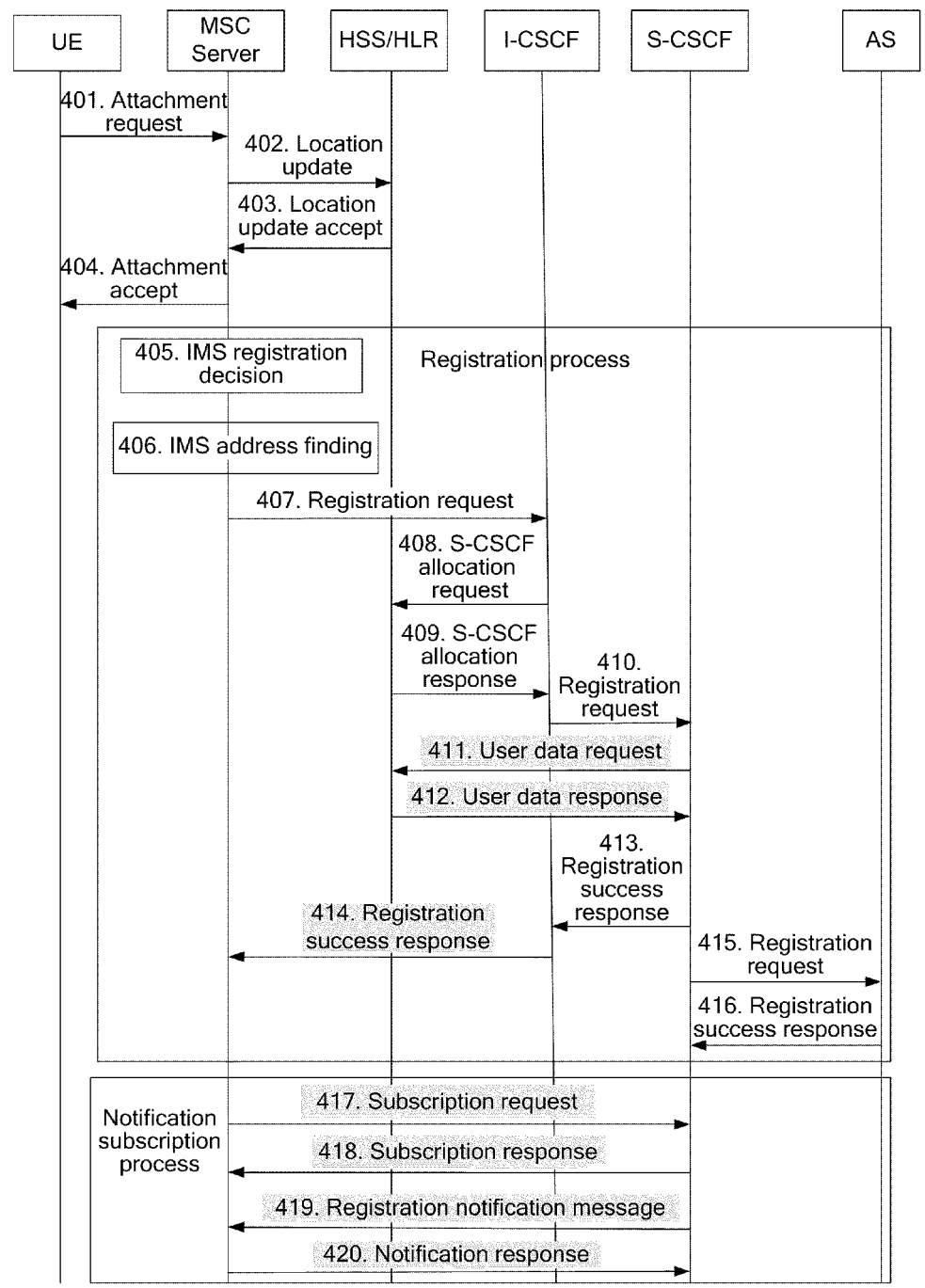
FIG. 4 is a registration flowchart of IMS centralized service in an existing technology.

FIG. 4 is a registration flowchart of IMS centralized service in an existing technology, as shown in FIG. 4, the process that the eMSC Server, instead of the CS UE, initiates the registration of the centralized service to the IMS, comprises the following steps.

Step 401, the UE initiates a CS attachment process and sends an attachment request to the MSC Server.

Step 402, the MSC Server sends a location update request to the HSS/HLR.

Step 403, the HSS/HLR accepts the location update and returns a location update accept response to the MSC Server.

In a specific implementation process, processes including CS access authentication and user data insertion are further performed in steps 402-403, moreover, the HSS/HLR may insert an IMS centralized service indication into the user data or the location update accept response, the IMS centralized service indication indicates that the user has subscribed IMS centralized service.

Step 404, the MSC Server returns an attachment accept response to the UE.

Step 405, after the UE is successfully attached to the MSC Server, the MSC Server performs an IMS registration decision, if it is found that the IMS centralized service indication is contained in the user data or the location update response, or the user is determined to be an IMS centralized service user according to a locally configured policy, then the MSC Server decides to initiate IMS registration instead of the user.

Step 406, the MSC Server deduces the home domain of the user from the identity of the user and finds the address of an appropriate entry point, such as the address of the I-CSCF.

Step 407, the MSC Server sends an SIP registration request to the I-CSCF, wherein the SIP registration request contains a private user identity and a public user identity which are deduced from the user identity, and an access mode indication indicating that the registration request is sent from the MSC Server.

Wherein the private user identity and the public user identity are deduced from the user identity according to a unified deduction rule, and different eMSC Servers deduce the same private user identity and the same public user identity.

Step 408, the I-CSCF sends an S-CSCF allocation request to the HSS to request the HSS to allocate an S-CSCF for serving the user.

Step 409, the HSS allocates an S-CSCF to the user, and sends information related to the allocated S-CSCF, such as the address or the identity of the S-CSCF, to the I-CSCF via an S-CSCF allocation response message.

Step 410, the I-CSCF forwards the registration request to the S-CSCF allocated by the HSS.

Step 411, if the S-CSCF determines that the registration request is from the MSC Server according to the access mode indication in the request, then it skips an authentication process, interacts with the HSS, and sends a user data downloading request to the HSS to request the downloading of subscription data of the user.

Step 412, the HSS returns a user data response containing the subscription data of the user to the S-CSCF.

Step 413, the S-CSCF returns a registration success response to the I-CSCF.

Step 414, the I-CSCF forwards the registration success response to the MSC Server.

Step 415, the S-CSCF triggers a third party registration process according to an initial filter rule of the subscription data of the user, sends a registration request to the AS, and informs the AS of registration information of the user.

Wherein an IMS centralized service application server and a telephone service application server are included in the AS.

Step 416, the AS returns a registration success response.

Until this step, the eMSC Server, instead of the UE, has completed the registration in the IMS and the establishment of a registration binding relationship in the S-CSCF, namely establishing a relationship between a private user identity, a public user identity and the contact address of the eMSC Server.

After the registration is successfully completed, it is further necessary for the eMSC Server to subscribe to the registration state of the user from the S-CSCF, and the S-CSCF returns the registration information of the user to the eMSC Server via a notification message.

Step 417, the eMSC Server sends a registration event subscription request to the S-CSCF, to request to subscribe to the registration event of the user.

Step 418, the S-CSCF accepts the subscription request and returns a subscription success response.

Step 419, after accepting the subscription, the S-CSCF sends registration information of the user to the eMSC Server via a notification message.

All registration information of the user in the S-CSCF is included in the registration notification message, including the registration relationship registered by the eMSC Server instead of the UE, which includes the following information:
<public user identity>, <contact address>, <registration state>, <registration event>, <other information>, wherein the public user identity is the one contained in the registration relationship;

the contact address is the actual contact address in the registration relationship;

the registration state is the actual state of the current registration relationship;

the registration event is the one leading to a registration change; and in a registration process, some information related to the contact address is stored in other information.

If the UE is attached to the eMSC Server for the first time and the MSC Server successfully completes the IMS registration instead of the user, then <public user identity=default public user identity>, <contact address=contact address of eMSC Server>, <registration state=activated>, <registration event=creation>, <other information includes characteristic information of IMS centralized service>.

When the UE moves to another eMSC Server, a new MSC Server performs the IMS registration instead of the user, and a new registration relationship replaces the one established by the former MSC Server, then corresponding registration information in the registration notification is changed into:

<public user identity=default public user identity>, <contact address=contact address of a new eMSC Server>, <registration state=activated>, <registration event=registration>, <other information includes characteristic information of IMS centralized service>.

Step 420, the eMSC Server returns a registration notification response.

When the UE is in an activated state in the eMSC Server, the MSC Server will refresh the subscription relationship regularly; when the registration state of the user changes, the S-CSCF initiatively notifies the subscriber; and after de-registering the user, the MSC Server initiatively deletes the subscription relationship.

Figure 5:
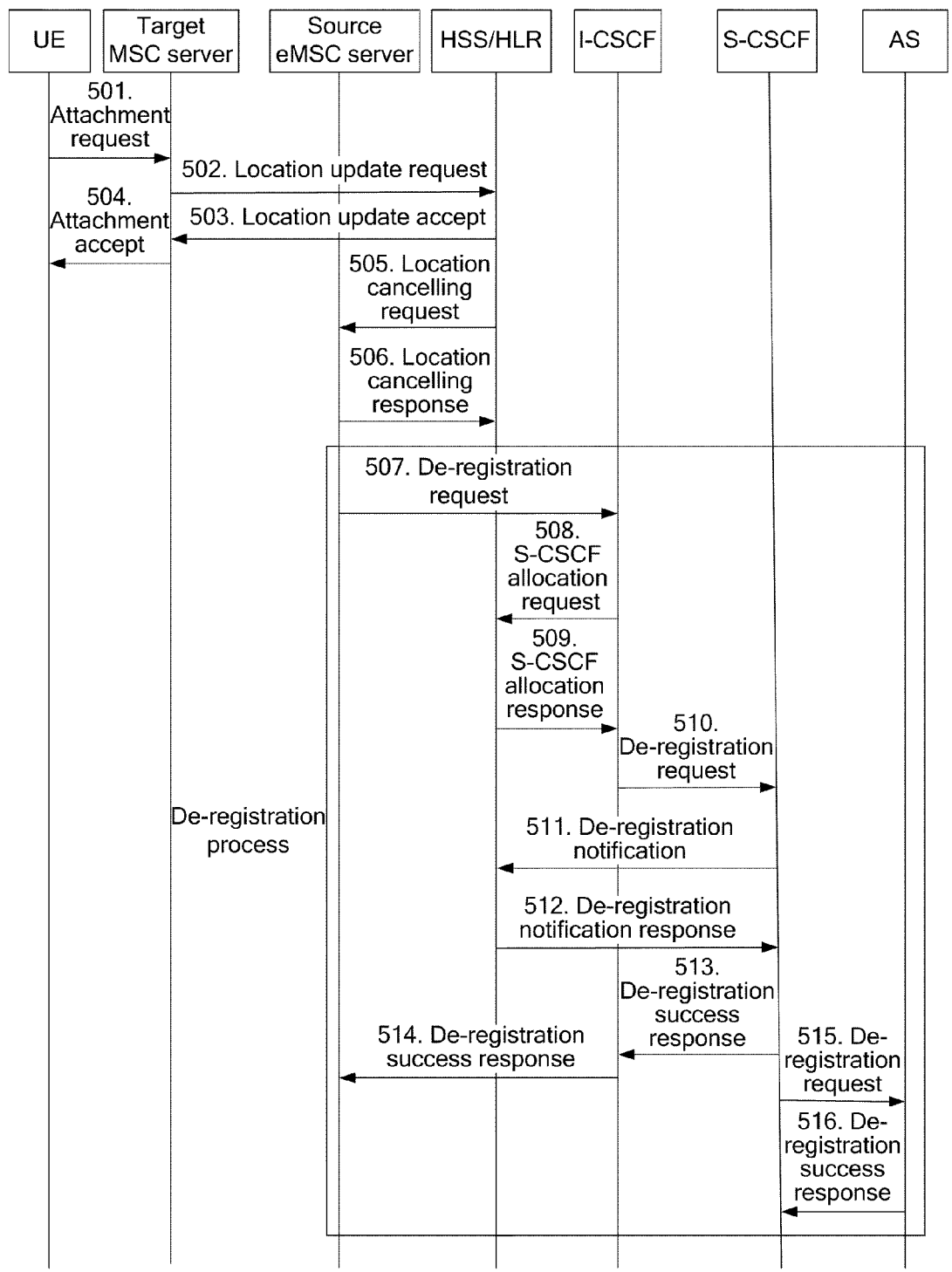
FIG. 5 is a de-registration flowchart of IMS centralized service in an existing technology.
Figure 6:
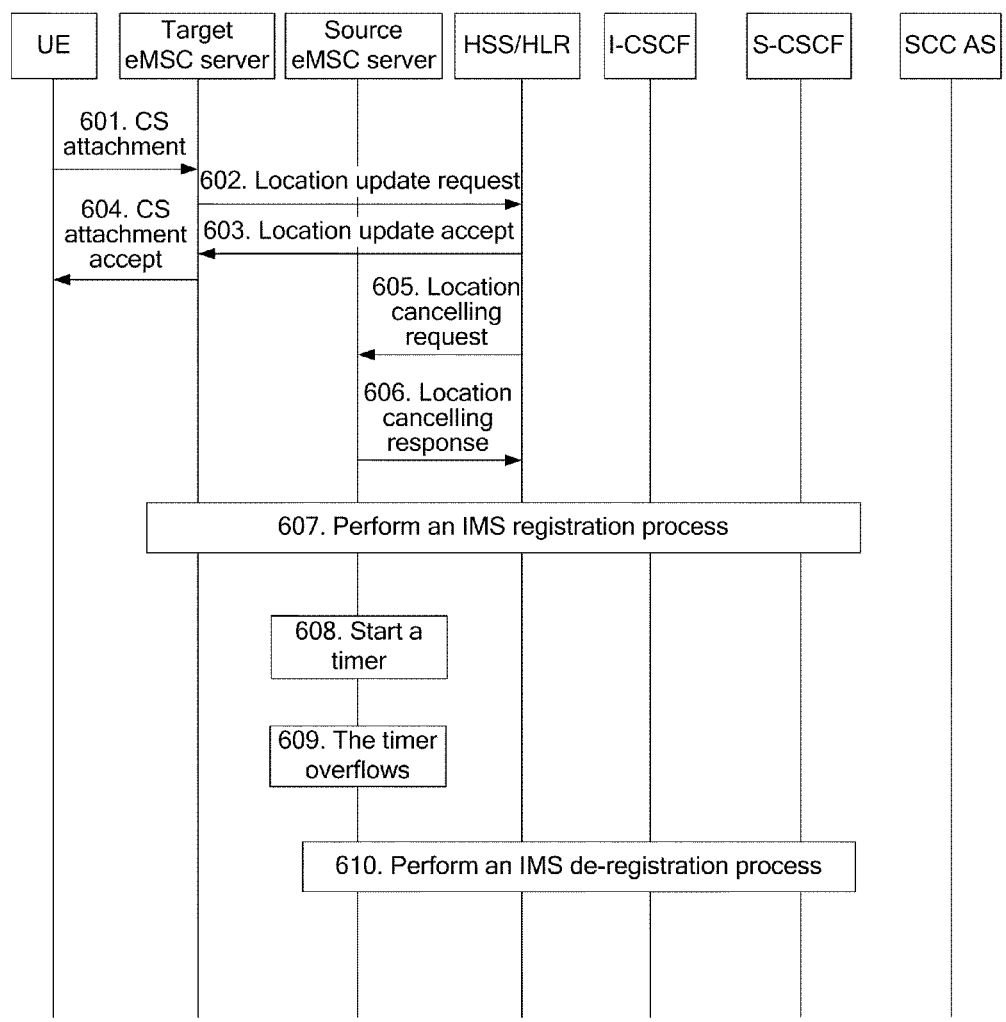
FIG. 6 is an implementation flowchart of Embodiment 1 of the present invention.

FIG. 5 illustrates the movement of the UE from the eMSC Server to another MSC Server in an existing technology, namely, FIG. 5 is a de-registration flowchart of IMS centralized service during a location cancelling process. When the UE has been successfully attached to the source eMSC Server and the source eMSC Server has registered successfully in the IMS instead of the UE, the UE moves to a target MSC Server, which may be an eMSC Server or a common MSC Server, as shown in FIG. 5, the process comprises the following steps.

Step 501, the UE initiates a CS attachment process and sends an attachment request to a target MSC Server.

Step 502, the target MSC Server sends a location update request to the HSS/HLR.

Step 503, the HSS/HLR accepts the location update and returns a location update accept response to the target MSC Server.

Processes of standard CS access authentication and user data insertion are further performed in steps 502-503.

If the HSS/HLR inserts an IMS centralized service indication into the user data or the location update accept response, which indicates that the user has subscribed IMS centralized service.

Step 504, the target MSC Server returns an attachment accept response to the UE.

When the target MSC Server is a common MSC Server, it ignores the IMS centralized service indication in the user data or the location update accept response and does not perform the IMS registration process instead of the UE;

when the target MSC Server is an eMSC Server, it performs the IMS registration instead of the UE according to the registration process shown in FIG. 4.

Step 505, the HSS/HLR sends a location cancelling request to the source MSC Server.

Step 506, the source MSC Server returns a location cancelling response to the HSS/HLR and deletes locally stored CS user data.

Step 507, as the UE is in a non-activated state in the source MSC Server, the source MSC Server performs an IMS de-registration process instead of the UE and sends a de-registration request to the I-CSCF.

Herein the step that the source MSC Server performs the IMS de-registration process instead of the UE is a de-registration process in which the MSC Server is required to send a de-registration request to the IMS; hereinafter, the local de-registration process means a process in which the MSC Server only locally deletes IMS registration data related to the user, without sending a de-registration request to the IMS.

Step 508, the I-CSCF interacts with the HSS, and sends an S-CSCF allocation request to the HSS, to request the HSS to allocate an S-CSCF for serving the user.

Step 509, the HSS specifies an S-CSCF for the user and sends an S-CSCF allocation response to the I-CSCF.

Step 510, the I-CSCF forwards the de-registration request to the specified S-CSCF.

Step 511, the S-CSCF interacts with the HSS and informs the HSS of the de-registration state of the user.

Step 512, the HSS returns a de-registration notification response to the S-CSCF.

Step 513, the S-CSCF returns a de-registration success response to the I-CSCF.

Step 514, the I-CSCF forwards the de-registration success response to the eMSC Server.

Step 515, the S-CSCF triggers a third party de-registration process according to an initial filter rule of subscription data of the user, sends a de-registration request to the AS, and informs the AS that the user has completed the de-registration.

Step 516, the AS returns a de-registration success response.

Based on the above processes, the present invention is illustrated in more detail in combination with the following embodiments of the present invention.

Embodiment 1

In this embodiment, the target MSC Server is an eMSC Server, when the CS UE moves from the source eMSC Server to a target eMSC Server, the eMSC Server performs an IMS registration process instead of the UE, the process comprises the following steps.

Steps 601-606 are identical to steps 501-506.

As the target MSC Server is an eMSC Server, thus it implements the following step 607 to perform an IMS registration process instead of the UE.

Step 607, the target MSC Server initiates an IMS registration process instead of the UE.

After the user successfully completes location update in the target MSC Server, the target MSC Server performs the IMS registration process instead of the UE and sends a registration request to the S-CSCF in the IMS; as the source MSC Server delays the sending of a de-registration request, thus the registration request arrives at the S-CSCF earlier than the de-registration request, the S-CSCF updates the registration binding relationship with a new one, namely, updating the relationship between a private user identity, a public user identity and the contact address of the target MSC Server.

Step 608, while step 607 is in process, the source MSC Server starts up delay timing, namely, starting a de-registration request sending timer.

Herein the delay time is set at the source eMSC Server locally, and the delay time is of enough length of time, which is required to be longer than the maximum time for the registration request of the target eMSC Server to arrive at the S-CSCF under normal conditions, so that it is guaranteed that the de-registration request sent by the source eMSC Server arrives at the S-CSCF later than the registration request which may be sent by the target MSC Server, wherein the delay time is an overflow value of the de-registration request sending timer.

Step 609, step 610 is triggered when the delay time is reached, namely, when the de-registration request sending timer overflows.

Step 610, the source MSC Server performs the IMS de-registration process instead of the UE.

As the de-registration request arrives at the S-CSCF later than the registration request, the registration binding relationship in the S-CSCF has been updated to a new one in the step 608; when the de-registration request arrives at the S-CSCF, the S-CSCF finds out a new registration relationship by matching the user information in the de-registration request with the existing registration relationship, and further compares the contact addresses of the MSC Servers, and rejects the de-registration request of the source MSC Server which process is served as an exception handling process if the contact addresses are found to be different; and the source MSC Server deletes local IMS registration data after receiving the refusal of the request. Therefore no service logic error is generated in this case, wherein the user information in the de-registration request includes a private user identity and a public user identity.

Embodiment 2

The source MSC Server, after successfully finishing the registration instead of the UE, will perform registration event subscription to acquire the change of the registration event; when the registration state of the user changes in the S-CSCF, the S-CSCF will notify the source MSC Server which is the subscriber, therefore, according to the information the source MSC Server can learn whether there is a target MSC Server finishing the registration instead of the user during the location cancelling process, if the registration has been completed, namely, the registration binding relationship of the user has been updated, then it is unnecessary for the source MSC Server to perform de-registration instead of the UE, the source MSC Server can directly perform a local de-registration process.

Figure 7:
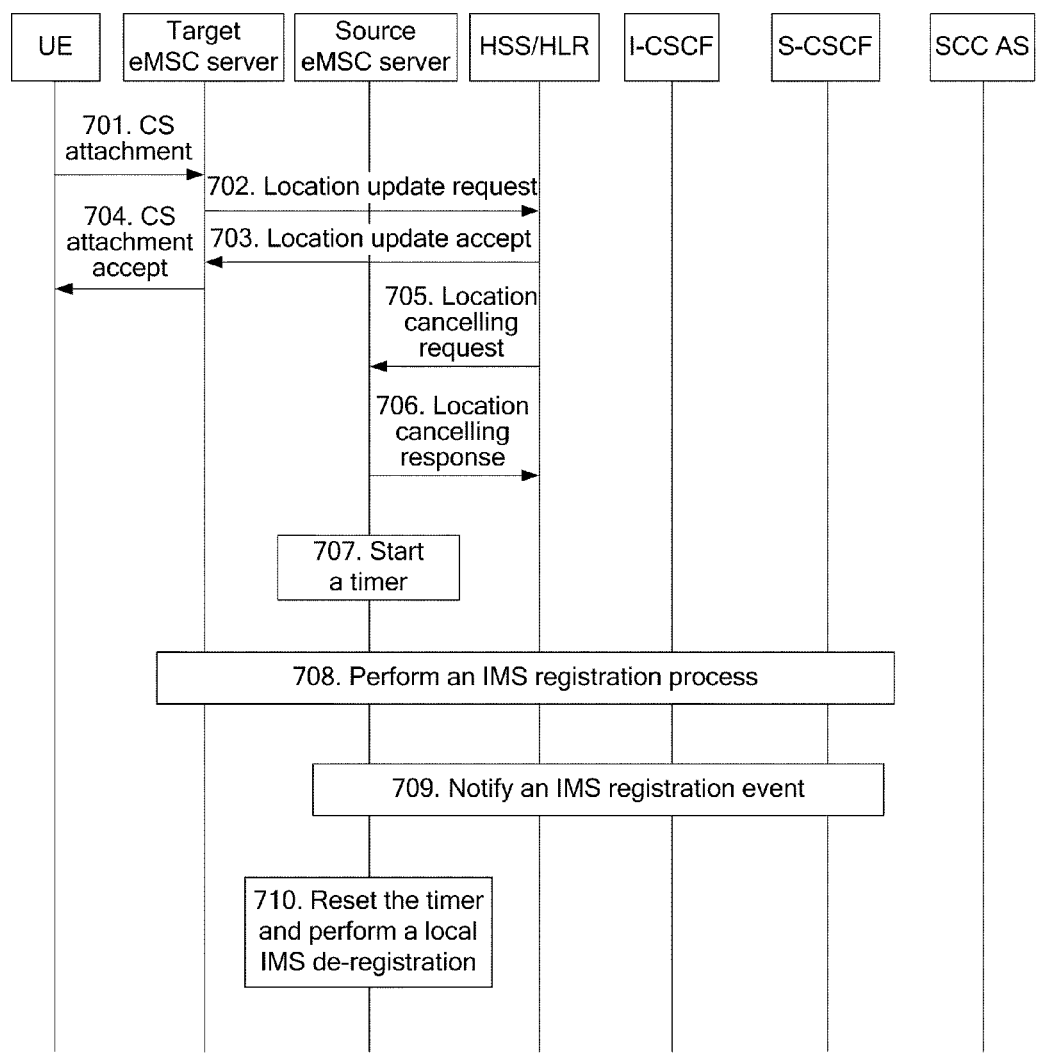
FIG. 7 is an implementation flowchart of Embodiment 2 of the present invention.

In this embodiment, as shown in FIG. 7, the process comprises the following steps.

Steps 701-706 are identical to steps 501-506.

As the target MSC Server is an eMSC Server, it implements step 708 to perform an IMS registration process instead of the UE.

Step 707, the source MSC Server starts a de-registration request sending timer.

Step 708, while step 707 is in process, the target MSC Server initiates an IMS registration process instead of the UE.

The target MSC Server sends a registration request to the S-CSCF in the IMS, the S-CSCF updates the registration binding relationship with a new one, namely, updating the relationship between a private user identity, a public user identity and the contact address of the target MSC Server.

Step 709, as the registration binding relationship has changed, the S-CSCF sends a registration notification message to the source MSC Server according to the registration event subscription relationship of the MSC Server in the S-CSCF, wherein the contact address of the registration binding relationship of the CS UE has changed from the contact address of the source MSC Server into the contact address of the target MSC.

Step 710, the source MSC Server checks the registration information in the notification message, if it finds that the contact address of the registration binding relationship established formerly has changed and the contact address is not its own contact address, then the source MSC Server determines that another eMSC Server has performed the IMS registration instead of the user, stops the de-registration request timer, performs a local de-registration process, and deletes local IMS registration data.

Embodiment 3

Figure 8:
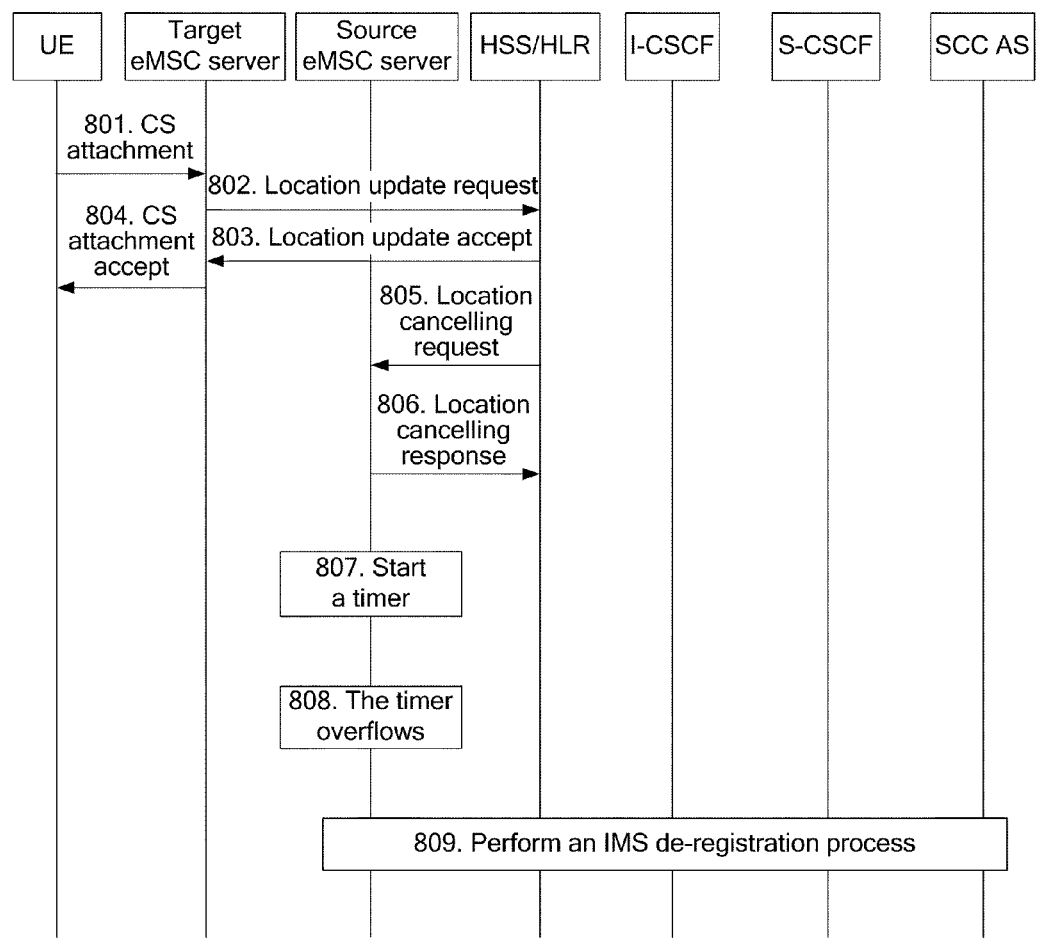
FIG. 8 is an implementation flowchart of Embodiment 3 of the present invention.

In this embodiment, the target MSC Server is a common MSC Server, when the CS UE moves from an eMSC Server to a common MSC Server which is a target MSC Server, in view of the fact that a common MSC Server will not perform IMS registration instead of the UE, as shown in FIG. 8, the process comprises the following steps.

Steps 801-806 are identical to steps 501-506; considering that the target MSC Server is a common MSC Server, the target MSC Server will not perform the IMS registration process instead of the UE, therefore the S-CSCF keeps the registration binding relationship established by the source MSC Server during the period from step 801 to step 809.

Step 807, the source MSC Server starts a de-registration request sending timer.

Herein the overflow value of the de-registration request sending timer is set at the eMSC Server locally, and the overflow value is of enough length of time, which is required to be longer than the maximum time for the registration request of a target eMSC Server to arrive at the S-CSCF under normal conditions, so that it is guaranteed that the de-registration request sent by the source eMSC Server arrives at the S-CSCF later than the registration request which may be sent by the target MSC Server.

Step 808, the de-registration timer overflows and step 809 is triggered.

Step 809, the source MSC Server performs an IMS de-registration process instead of the CS UE.

In this process, the source MSC Server sends a de-registration request to the S-CSCF via the I-CSCF; as the S-CSCF stores the registration binding relationship established by the source MSC Server, namely, storing the relationship between a private user identity, a public user identity and the contact address of the source MSC Server, the S-CSCF deletes the registration binding relationship after receiving the de-registration request and returns a de-registration success response to the source MSC Server, and the source MSC Server deletes the locally stored IMS registration data.

As mentioned above, with the present invention, the source eMSC Server delays the sending of a de-registration request when the CS UE moves between MSC Servers, so as to guarantee that the de-registration request of the source MSC Server arrives at the S-CSCF later than the registration request of the target MSC Server, thus unnecessary redundant signaling is avoided and the system processing efficiency is improved.

A de-registration system for IMS centralized service comprises a delay timing unit and a de-registration unit; wherein the delay timing unit is used to start up delay timing when a CS UE moves from a source eMSC server into the control area of a target MSC server, and after the source eMSC Server receives a location cancelling request sent by an HSS/HLR during a location cancelling process in which the CS UE changes the MSC Server to which it is attached; and the de-registration unit is used to implement IMS de-registration which is performed by the source eMSC Server instead of the CS UE when the delay time is reached.

Herein the delay timing unit is further used for that: the source eMSC Server starts up delay timing by starting a de-registration request sending timer when the de-registration request sending timer is configured; and the de-registration unit is further used for that: when the de-registration request sending timer overflows, the delay time is reached and the source eMSC Server performs the IMS de-registration instead of the CS UE.

Herein the de-registration unit is further used for that: the source eMSC Server, instead of the CS UE, sends an IMS de-registration request to the IMS; and the source eMSC Server deletes local IMS registration data when receiving a de-registration success response or a de-registration failure response.

Herein the de-registration unit is further used for that: under the condition that the target MSC Server is an eMSC Server, the target eMSC Server performs an IMS registration process instead of the CS UE, and an old registration binding relationship is replaced by a new one in an S-CSCF, and the S-CSCF rejects the IMS de-registration request after the IMS de-registration request sent by the source eMSC Server instead of the CS UE arrives at the S-CSCF.

Herein the de-registration unit is further used for that: under the condition that the target MSC Server is a common MSC Server, the S-CSCF de-registers an old registration binding relationship after the IMS de-registration request sent by the source eMSC Server instead of the CS UE arrives at the S-CSCF.

IMS centralized service mentioned above can be represented by ICS for short.

Of course, the present invention may have various other embodiments; those skilled in the art can make various corresponding modifications and transformations based on the present invention, without departing from the spirit and essence of the present invention, but these corresponding modifications and transformations are all within the protection scope of the appended claims of the present invention.

The invention claimed is:

1. A de-registration method for IP multimedia subsystem centralized service, comprising:
    a Circuit Switched User Equipment (CS UE) moving from a source enhanced Mobile Switch Centre Server (eMSC Server) into the control area of a target Mobile Switch Centre Server (MSC Server); during a location cancelling process in which the CS UE changes the MSC Server to which it is attached, starting up, by the source eMSC Server, delay timing after receiving a location cancelling request sent by a Home Subscriber Server (HSS)/a Home Location Register (HLR);
    when the delay time is reached, which indicates that a registration request of the target MSC Server should arrive at a Serving Call Session Control Function (S-CSCF), performing, by the source eMSC Server, IP Multimedia Subsystem (IMS) de-registration instead of the CS UE,
    wherein when a de-registration request sending timer is configured, the step of starting up delay timing further comprises: starting up, by the source eMSC Server, delay timing by starting the de-registration request sending timer;
    the de-registration further comprises: when the de-registration request sending timer overflows, which indicates the delay time is reached, performing, by the source eMSC Server, the IMS de-registration instead of the CS UE.

2. The method according to claim 1, wherein the delay time is further configured at the source eMSC Server locally;
    specifically, the delay time is longer than the maximum time for a registration request of a target eMSC Server to arrive at the S-CSCF via an Interrogating Call Session Control Function (I-CSCF) under normal conditions.

3. The method according to claim 1, wherein the IMS de-registration specifically comprises: the source eMSC Server, instead of the CS UE, sends an IMS de-registration request to the IMS; and the source eMSC Server deletes local IMS registration data when receiving a de-registration success response or a de-registration failure response.

4. The method according to claim 3, wherein under the condition that the target MSC Server is an eMSC Server, the IMS de-registration further comprises: the target eMSC Server performs an IMS registration process instead of the CS UE, and an old registration binding relationship is replaced by a new one in the S-CSCF; and the S-CSCF rejects the IMS de-registration request after the IMS de-registration request sent by the source eMSC Server instead of the CS UE arrives at the S-CSCF.

5. The method according to claim 3, wherein under the condition that the target MSC Server is a common MSC Server, the IMS de-registration further comprises: the S-CSCF de-registers an old registration binding relationship after the IMS de-registration request sent by the source eMSC Server instead of the CS UE arrives at the S-CSCF.

6. The method according to claim 1, wherein further comprising: under the condition that the delay time is not reached, if the contact address of a registration relationship established by the source eMSC Server, which is included in a registration notification message received by the source eMSC Server from the S-CSCF is not the contact address of the source eMSC Server itself, the source eMSC Server stops delay timing and deletes locally stored registration data of the CS UE.

7. The method according to claim 1, wherein further comprising: under the condition that the delay time is reached, the source eMSC Server sends a de-registration request to the S-CSCF via the I-CSCF.

8. A source eMSC Server, for implementing de-registration for IP multimedia subsystem centralized service, comprising a processor and a memory coupled to the processor,
    wherein the memory contains instructions, which, when being executed, cause the processor to perform the following:
    when a CS UE moves from the source eMSC Server into the control area of a target MSC Server, starting up delay timing after receiving a location cancelling request sent by an HSS/HLR during a location cancelling process in which the CS UE changes the MSC Server to which it is attached;
    performing IMS de-registration instead of the CS UE, when the delay time is reached, which indicates that a registration request of the target MSC Server should arrive at a Serving Call Session Control Function (S-CSCF),
    wherein when a de-registration request sending timer is configured, the source eMSC Server starts UP delay timing by starting the de-registration request sending timer; and
    when the de-registration request sending timer overflows, the delay time is reached and the source eMSC Server performs the IMS de-registration instead of the CS UE.

9. The source eMSC Server according to claim 8, wherein the source eMSC Server, instead of the CS UE, sends an IMS de-registration request to the IMS; and the source eMSC Server deletes local IMS registration data when receiving a de-registration success response or a de-registration failure response.

10. The source eMSC Server according to claim 9, wherein under the condition that the target MSC Server is an eMSC Server, the target eMSC Server performs an IMS registration process instead of the CS UE, and an old registration binding relationship is replaced by a new one in an S-CSCF; and the S-CSCF rejects the IMS de-registration request after the IMS de-registration request sent by the source eMSC Server instead of the CS UE arrives at the S-CSCF.

11. The source eMSC Server according to claim 9, wherein under the condition that the target MSC Server is a common MSC Server, the S-CSCF de-registers an old registration binding relationship after the IMS de-registration request sent by the source eMSC Server instead of the CS UE arrives at the S-CSCF.

\* \* \* \* \*